United States Patent
Waggoner et al.

(10) Patent No.: US 10,728,568 B1
(45) Date of Patent: Jul. 28, 2020

(54) VISUAL ELEMENT ENCODING PARAMETER TUNING

(71) Applicant: Amazon Technologies, Inc., Seattle, WA (US)

(72) Inventors: Charles Benjamin Franklin Waggoner, Portland, OR (US); Yongjun Wu, Bellevue, WA (US); Hai Wei, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/933,028

(22) Filed: Mar. 22, 2018

(51) Int. Cl.
*H04N 19/46* (2014.01)
*H04N 19/52* (2014.01)
*H04N 19/176* (2014.01)

(52) U.S. Cl.
CPC .......... *H04N 19/46* (2014.11); *H04N 19/176* (2014.11); *H04N 19/52* (2014.11)

(58) Field of Classification Search
USPC .................................................. 375/240.16
See application file for complete search history.

(56) References Cited

U.S. PATENT DOCUMENTS

| | | | | |
|---|---|---|---|---|
| 2003/0093801 | A1* | 5/2003 | Lin ..................... | H04N 5/783 725/90 |
| 2003/0128759 | A1* | 7/2003 | Prakash ................ | G06T 9/001 375/240.08 |
| 2008/0007651 | A1* | 1/2008 | Bennett ................ | H04N 7/162 348/443 |
| 2010/0158099 | A1* | 6/2010 | Kalva ................ | H04N 21/23412 375/240.01 |
| 2018/0024991 | A1* | 1/2018 | Baldwin ............. | G06F 17/2785 704/9 |

* cited by examiner

*Primary Examiner* — Behrooz M Senfi
(74) *Attorney, Agent, or Firm* — Weaver Austin Villeneuve & Sampson LLP

(57) ABSTRACT

Techniques are described for adaptive encoding of different visual elements in a video frame. Characteristics of visual elements can be determined and used to set encoding parameters for the visual elements. The visual elements can be encoded such that one visual element is encoded differently than another visual element if they have different characteristics.

20 Claims, 4 Drawing Sheets

VISUAL ELEMENT ENCODING PARAMETER TUNING

BACKGROUND

Video content is typically encoded using compression algorithms to reduce the number of bits needed to transmit video frames for the video content to a viewer's device where they are decoded for playback. A single set of encoding parameters is typically used during the encoding process. Unfortunately, a single set of encoding parameters might not result in the best encoding for some visual elements of a given video frame.

DETAILED DESCRIPTION

This disclosure describes media content encoding techniques for selecting encoding parameters for visual elements of a video frame. Certain visual elements are repeated within media content, and using a high quality encoding of the visual element as a reference for each repeated instance of the visual element improves coding efficiency. For example, a high quality encoding of a letter A that is repeated within a video frame or in other video frames can improve image quality and reduce transmission bitrates. Separately, visual elements with different characteristics may be encoded with different encoding parameters. As an example, a video frame may include both the letter A and a depiction of a natural landscape. Encoding the letter A without using a frequency transform and encoding the depiction of the natural landscape using a frequency transform may provide efficient use of encoding bits while still maintaining high image quality for the video frame.

A video frame is composed of pixels, and a subset of the pixels may correspond to a visual element within the video frame. A video frame can have different visual elements, and/or multiple instances of the same visual element, with or without minor variations. Different visual elements might correspond to different types of content. For example, some visual elements might be synthetic such as text, motion graphics, 2D/3D computer-generated imagery (CGI), while some other visual elements might be natural imagery such as footage captured by a camera. The subset of pixels corresponding to each of the different visual elements might also have different noise, sharpness, quality, motion, and other characteristics. Each of these subsets of pixels with different characteristics can be associated with different encoding parameters to provide a higher quality encoding of the overall video frame.

In some implementations, characteristics of the different visual elements of a video frame are received by the encoder. For example, a content source generating the visual elements, such as scrolling end credits, provides the characteristics (e.g., font size, scroll rate, etc.) of the visual elements to the encoder. In certain implementations, the encoder can use the received characteristics to encode the video frame in a one pass encoding process, which, for example, may be beneficial for encoding live content for real-time distribution. Based on the different received characteristics, the corresponding visual elements can be encoded with different sets of encoding parameters.

Figure 1:
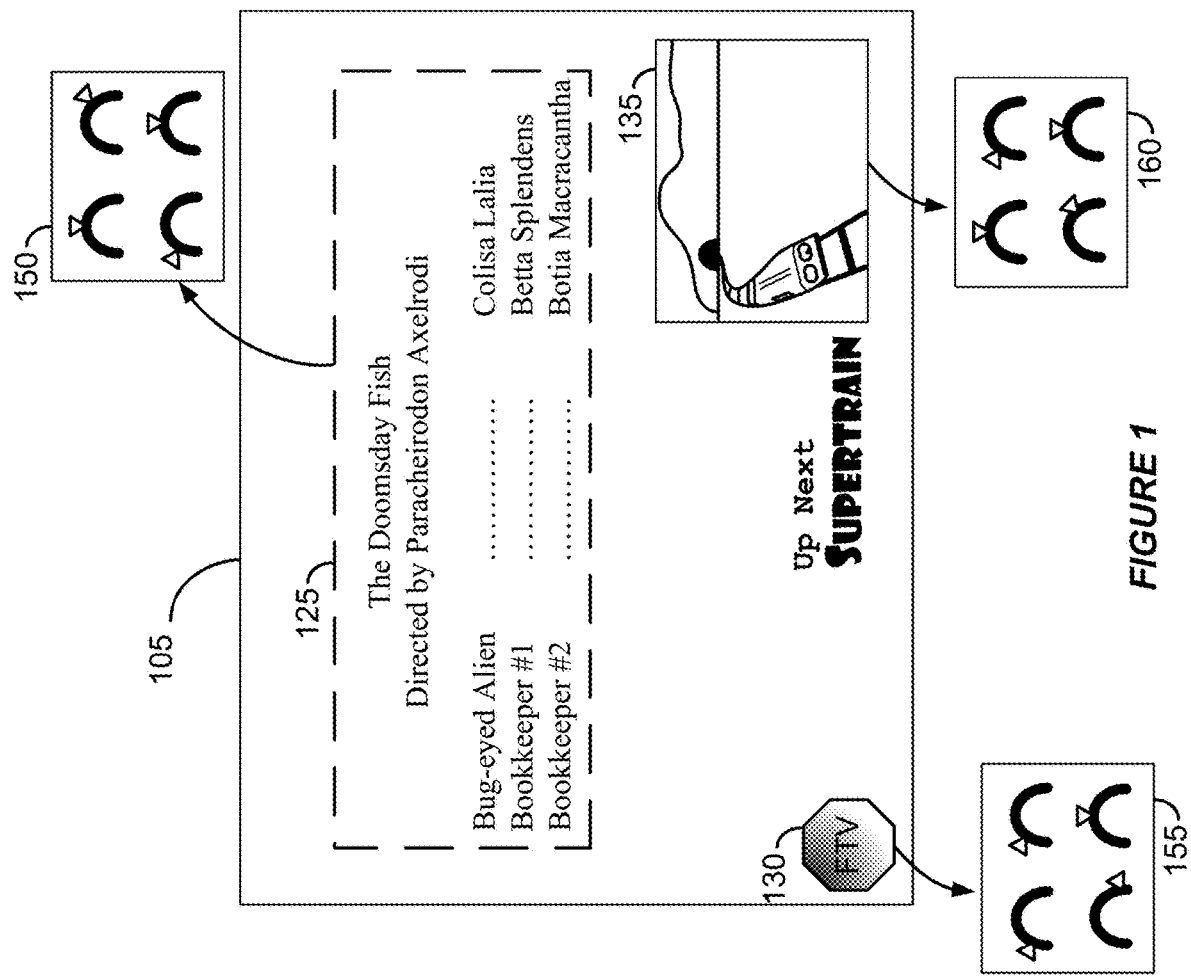
FIG. 1 illustrates an example of encoding visual elements of a video frame with different parameter settings.

In more detail, FIG. 1 illustrates an example of encoding visual elements of a video frame with different encoding parameters. Video frame 105 includes multiple visual elements having different characteristics. For example, the first visual element 125 provides the end credits as a scrolling list. Visual element 130 is a computer-generated image (CGI) logo for the media channel that is characterized by shading, an irregular shape, and significant contrast with surrounding imagery. Visual element 135 is a picture-in-picture (PIP) preview of a scene of Supertrain, live-action media content with continuous tone and natural imagery that will be presented next.

Conventionally, encoding parameters are applied to the entirety of video frame 105. For example, during the encoding process, a first pass analyzing video frame 105 would be performed to determine the set of encoding parameters to be applied to the entire video frame 105. The determined set of encoding parameters might be generalized from an average complexity estimate of video frame 105. For example, if more of the visual elements include text and motion graphics with sharp edges, then a value of an encoding parameter such as the quantization parameter can be tuned to accommodate the high spatial frequency content. If more of the visual elements include natural imagery with smooth, continuous tones, the quantization parameter can be tuned to provide efficient coding of a low spatial frequency content video frame. However, using one set of encoding parameters for a video frame with different types of visual elements results in certain visual elements being encoded inefficiently, resulting in using more bits than necessary, and in some scenarios, degrading visual quality for certain visual elements.

By contrast, and as illustrated in FIG. 1, rather than applying the same encoding parameters to all of the visual elements of video frame 105, different parameter settings can be applied to the visual elements. For example, in FIG. 1, parameter settings 155 can be used to encode visual element 130. Likewise, parameters settings 160 can be used to encode visual element 135, and parameter settings 150 can be used to encode visual element 125.

The values for the parameter settings might be different to account for the different characteristics of the visual elements. For example, since visual element 125 includes scrolling text representing the closing credits for video frame 105, a transform skip parameter might be selected as one of parameter settings 155. This might be done because the number of bits to encode the high spatial frequency content corresponding to the sharp edges of the text may exceed the number of bits needed to directly encode the non-transformed pixel values corresponding to the text By contrast, parameter settings 160 used to encode visual element 135 may not include the transform skip setting. This may be because visual element 135 corresponds to natural imagery with smooth, continuous tones that are efficiently represented by the outputs of a transform, such as the Discrete Cosine Transform (DCT).

As a result, each of the visual elements can be encoded using encoding parameters selected based on the characteristic of the visual elements. In certain implementations, this may allow for features relating to one or more of: a more selective encoding process, providing better compression, shorter encoding latency, and/or better overall video quality for each video frame and/or its visual elements.

Figure 2:
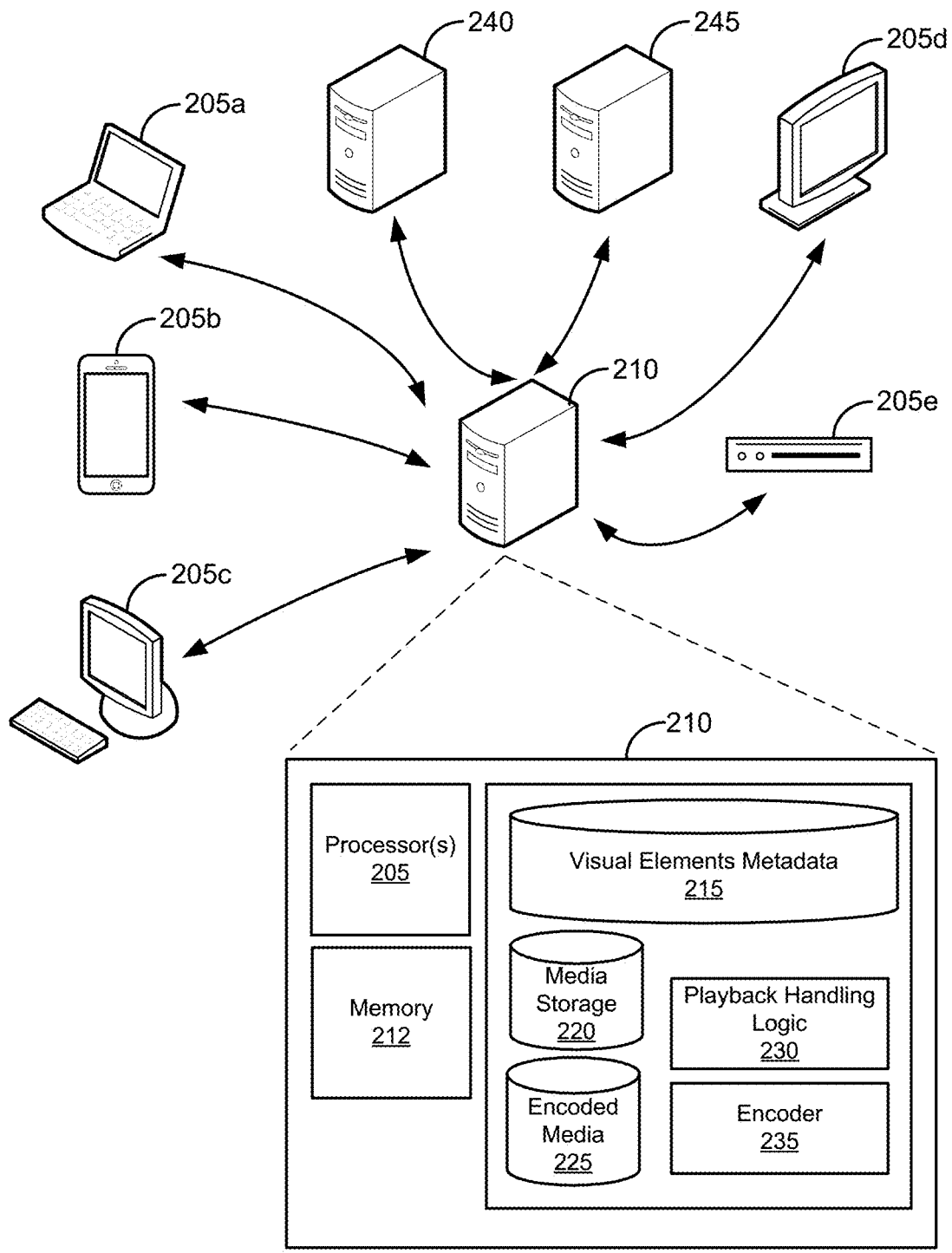
FIG. 2 illustrates an example of a computing environment for encoding visual elements of a video frame.

FIG. 2 illustrates an example of a computing environment for encoding visual elements of media content. The computing environment of FIG. 2 includes a media server 210 that can be used to encode and provide media content to viewer devices 205a-e. Viewer devices 205a-e can decode the encoded media content for playback. Viewer device 205a is a set-top box, viewer device 205b is a laptop computer, viewer device 205c is a smartphone, viewer device 205d is a television, and viewer device 205e is a desktop computer. However, related functionality may also be implemented within tablets, wearable devices, virtual or augmented reality headsets, video game consoles, etc.

Media server 210 can conform to any of a wide variety of architectures and its functionality may be implemented by a variety of servers. For example, one server might encode media content and the encoded media content might be provided to another server, for example, belonging to a content delivery network (CDN). As such, the functionality and components of media server 210 can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the encoding and delivery of media content and data related to the media content, including content providers, internet service providers (ISPs), providers of content delivery networks (CDNs), etc. The functionality described herein also may be implemented by one or more different entities. For example, the functionality to provide playback of media content can be integrated into a video player or software client under control of one entity (e.g., on viewer devices 205a-e), integrated into a separate app from another entity, implemented in an edge server or content server of a CDN, a server of an ISP, etc.

It should be noted that, despite references to particular computing paradigms and software tools herein, the computer program instructions on which various implementations disclosed herein are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

In FIG. 2, media server 210 can include various types of logic used to implement an encoder 235 to encode a video frame using characteristics of visual elements stored in visual elements metadata 215. Media server 210 can include a media storage 220 for storing video frames to encode.

In certain implementations, encoder 235 uses visual elements metadata 215 to encode the video frame in a one pass encoding process, with or without lookahead. In certain scenarios, one-pass encoding emphasizes speed, which, for example, may be beneficial for real-time encoding during live event streaming.

In various implementations, encoder 235 uses visual elements metadata 215 in a multi-pass encoding process. For example, encoding parameters for the visual elements, video frames, and/or groups of pictures (GOPs) may be determined in the first pass and/or subsequent passes.

In some implementations, encoder 235 generates visual elements metadata 215. For example, encoder 235 can use multi-pass encoding, and in a first stage of the encoding process, encoder 235 can analyze a received video frame stored in media storage 220 to determine various characteristics of the visual elements in the video frame. For example, encoder 235 can flag a region of text and perform optical character recognition (OCR) on the letters in the region. A second stage of the multi-pass encoding then encodes the video frame using the characteristics determined during the first-pass, such as, for example, the size and location of the region of text, the repetition of particular alphanumeric characters in the region, and so forth. In some scenarios, a higher quality or better compressed encode of the media content can be generated since the encoding is based on detailed analysis by encoder 235 of the various characteristics of the media content itself.

In various implementations, media server 210 can transmit video frames stored in media storage 220 to a semantic data server 245 for analysis. For example, semantic data server 245 can execute text detection software to perform the region of text detection and OCR process as described above, and can provide to media server 210 the size, location, repetition and other visual element characteristics as described above for configuring encoding parameters of encoder 235.

In certain implementations, media server 210 receives visual elements metadata 215 from a content source 240. It should be appreciated that reference to media server 210 receiving characteristics for a visual element from content source 240 includes content source 240 generating such characteristics through content analysis by content source 240 itself, or through the involvement of semantic data server 245, or by content source 240 incorporating or modifying visual element characteristics received by content source 240. In some implementations, the characteristics of encoder 235 can be provided to content source 240 such that the generated content can be tailored to the characteristics of encoder 235, which may result in greater coding efficiency by encoder 235.

It should be appreciated that content source 240 can correspond to any particular content preparation stage, including from initial production of a raw content asset to final preprocessing immediately before handing off to encoder 235.

In a class of implementations, content source 240 can correspond to the production stage. For example, a camera shooting video can be part of a production system that embeds visual element metadata based on, such as, but not limited to, manual input, image processing for object recognition, or text analysis of a movie script. As another example, a computer or human animator during the creation of animation or other forms of 2D/3D computer-generated imagery can annotate the raw asset with visual element metadata.

As a further example, content source 240 can correspond to a graphics Application Programming Interface (API) system. As a nonlimiting example, Graphics Device Interface (GDI) is a graphics application programming interface used in Microsoft Windows. In GDI, instead of providing a raster image of a filled rectangle, an instruction to render a rectangle at coordinate (X,Y) with a given width, height, and fill color is provided. The client then executes the drawing instructions to produce the intended graphics result. Visual elements metadata 215 can include the original graphics API drawing instructions that characterize the visual element, or can include metadata generated by the graphics API system that is associated with the rendering output.

In another class of implementations, content source 240 can correspond to the postproduction stage. For example, a system for video content editing and/or compositing (e.g., combining multiple text visual elements with or without natural imagery, combining 3D CGI with natural imagery such as in the Avatar movie, etc.) can incorporate visual elements metadata generated during the production stage, or can analyze the postproduction content to generate characteristics for storage in visual elements metadata 215. It should be appreciated that portions of visual elements metadata 215 for a particular visual element may be generated at multiple stages. For instance, the production system may be able to create metadata regarding the size of the visual element, whereas during the postproduction stage, the specific position of the visual element can be added.

In a further class of implementations, content source 240 can correspond to the preprocessing stage, which can include any processing performed prior to handing off for encoding, such as transmitting to media server 210 with encoder 235. For example, preprocessing includes cropping, scaling, deinterlacing, image adjustment, noise reduction, etc. As an example, for accessibility purposes, a preprocessing step may include scaling the size of a visual element, such as text, for the visually impaired. As non-limiting examples, the preprocessing system may modify metadata generated in an earlier stage to reflect the new size of the visual element, or the preprocessing system may perform content analysis to derive the size of the scaled visual element.

In some implementations, content source 240 can be integrated with media server 210 having encoder 235. For example, for media server 210 receiving video frames of a sports broadcast, media server 210 may include a content source 240 that generates both the motion graphics and metadata describing the motion graphics corresponding to a score box for the received sports video content.

In a certain class of implementations, characteristics for a visual element can be embedded in a video frame received by media server 210, multiplexed with video frame/GOP data in a transmission (e.g., MPEG-2 transport stream) received by media server 210, or transmitted through a sideband communication channel with media server 210. In some implementations, characteristics of the visual element are provided to media server 210 concurrently with providing the video frame containing the visual element. In other implementations, there may be a time offset between when media server 210 receives characteristics of the visual element and the corresponding video frame, such as, for example, when additional preprocessing of the video frame is required, or delays associated with processing by semantic data server 245. In various implementations, visual elements metadata 215 includes information for time-synchronizing the received characteristics of a visual element with the associated video frames.

In certain implementations, visual elements metadata 215 can be one or more markup files or other types of data structures, data provided over an API, etc. As a nonlimiting example, visual elements metadata 215 can conform to the Description Definition Language (DDL) based on the eXtensible Markup Language (XML) extensions defined specifically for MPEG-7.

In some implementations, visual elements metadata 215 includes a descriptor that can specify how the value of a feature, such as a circle shape or alphanumeric character, is represented. In some implementations, the descriptors are based on a grid layout or a histogram profile, each of which can be used separately or in combination. For example, the grid layout permits defining characteristics of different portions of a visual element, such as individual letters in a caption. The histogram profile can describe measurable characteristics over the whole subset of pixels corresponding to the visual element, such as a complexity estimate.

In certain implementations, a description scheme can collate multiple descriptors into sets that represent a higher-level semantic representation of a visual element, such as a collection of alphanumeric characters corresponding to scrolling end credits.

Visual elements metadata 215 can include characteristics that correspond to a wide variety of categories. As nonlimiting examples, categories may include those defined by the MPEG-7 Visual standard, such as color, texture, shape, and motion.

In certain implementations, visual elements metadata 215 can include color characteristics, such as but not limited to a dominant color(s) parameter to indicate where a small number of colors, which can be derived by color value quantization, can accurately characterize a visual element. As another example, a color histogram, with or without color quantization, can be used to characterize a visual element.

In some implementations, visual elements metadata 215 can include texture characteristics, including but not limited to parameters for texture type (e.g., synthetic, natural, etc.), edges, and for homogeneous textures. For example, parameters can specify the edges corresponding to a border for a picture-in-picture preview of an upcoming media presentation. As another example, homogeneous textures can be described by filtering coefficients that characterize the regularity and coarseness of textures, such as an asphalt roadway.

In various implementations, visual elements metadata 215 can include shape characteristics including but not limited to position and/or size for boundary box or contour-based representations of the shape of visual elements in a video frame. In certain implementations, shape characteristics can account for shape changes because of scaling, or shape changes due to occlusion occurring between multiple visual elements.

In a class of implementations, visual elements metadata 215 can include motion characteristics. For example, motion characteristics can describe camera motion, camera zoom, scene transitions, motion trajectory (e.g., vertical scrolling end credits, horizontal scrolling stock tickers), parametric motion of objects (e.g., arc path of a baseball), and motion indicators used to characterize, for example, the distance to a $1^{st}$ down or the running pattern of a receiver in a football broadcast.

In particular implementations, visual elements metadata 215 can include level of interest characteristics. For example, visual elements in the center of the screen can be assigned a higher level of interest than visual elements at the edge. As another example, computational text analysis of the subtitles or audio analysis of dialogue may identify certain objects that should be rendered with higher quality encoding parameters. For example, for an educational video content discussing a famous abstract sculpture, the visual element corresponding to the sculpture can be flagged with a high level of interest. As another example, facial recognition algorithms can be used to identify the portion of a video frame with facial features to be rendered with greater quality for a real-time videoconferencing context.

In various implementations, video frames stored in media storage 220 are encoded using visual elements metadata 215. It should be noted that media storage 220 can include video frames from different media content, such as movie content and dynamically inserted content (e.g., advertisements, personalized content, etc.). In some implementations, certain video frames stored in media storage 220 are encoded using visual elements metadata 215, while certain video frames are not, such as for dynamically inserted content, or for video frames where visual element characteristics are unavailable. The encoded media content is then stored in memory such as encoded media content 225.

Media server 210 can also implement playback handling logic 230 to provide requested manifest files to viewer devices 205*a-e* so that they can request the encoded media content for playback. Media server 210 can include one or more processor circuits 205, memory 212, and other hardware components to encode media content and provide the encoded media content to viewer devices 205*a-e*. For example, processor circuits 205 can execute stored instructions in memory 212 of media server 210 to implement encoding techniques disclosed herein.

Viewer devices 205*a-e* can also include various types of logic used to implement a decoder to decode the encoded media content received from media server 210 and store the decoded media, as well as playback handling logic to request manifest files and store the manifest files, and request fragments of the encoded media content based on the manifest files. Viewer devices 205*a-e* can include one or more processors, memory, and other hardware components to request and decode the encoded media content provided by media server 210. For example, the processors of viewer devices 205*a-e* can execute stored instructions in memory of the corresponding viewer device to implement decoding techniques based on the encoding techniques disclosed herein. It should be noted that in some implementations, viewer devices 205*a-e* can use the same decoder logic for decoding video frames encoded using visual elements metadata 215, and video frames encoded with encoding parameters that apply to the entire video frame.

Figure 3:
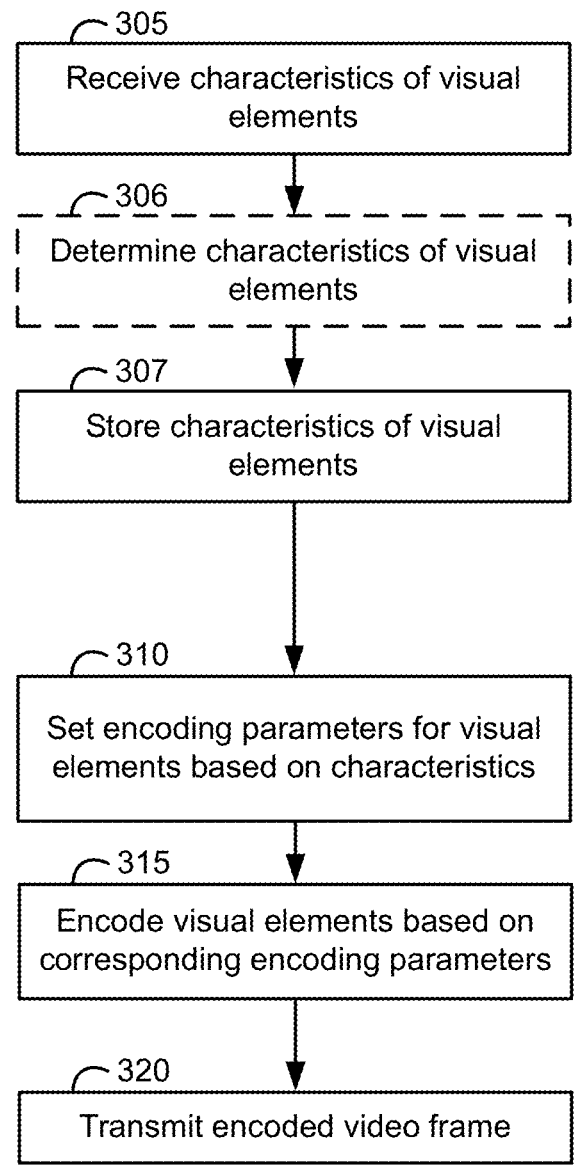
FIG. 3 is a flowchart illustrating an example of encoding visual elements of a video frame.

A specific implementation will now be described with reference to FIG. 1, the computing environment of FIG. 2, the flow diagram of FIG. 3, and the two example video frames of FIG. 4. In FIG. 3, media server 210 receives characteristics of the visual elements of the media content and does not perform analysis to generate characteristics of the visual elements (305). In some implementations, media server 210 does not receive any characteristics and instead analyzes the video frames to generate characteristics of the visual element (306). In various implementations, media server 210 both receives characteristics and analyzes the video frames to generate additional characteristics of the visual element.

The characteristics can then be stored, for example, in visual elements metadata 215 of FIG. 2 (307).

The encoding parameters for the visual elements can be set based on the characteristics stored in visual elements metadata 215 (310). For example, the characteristics of a visual element can be looked up in visual elements metadata 215 and used to generate or adjust encoding parameters for encoding the visual element.

In some implementations, the characteristics stored in visual elements metadata 215 can be used to configure intraframe prediction related encoding parameters that take advantage of spatial redundancy. For example, the location of the visual element, the components of the visual element, or each instance of the visual element are known and may be provided to media server 210 by content source 240 or semantic data server 245.

These characteristics can be used to configure prediction encoding parameter(s) such as a pixel location, a range of pixels to search, a search resolution (e.g., n-pixels, sub-pel half pixel, sub-pel quarter pixel, etc.). In such scenarios, the search shape and range can be constrained, and/or the search resolution can be configured to achieve a balance between prediction accuracy (i.e., using a finer pixel resolution) and encoding latency.

Figure 4:
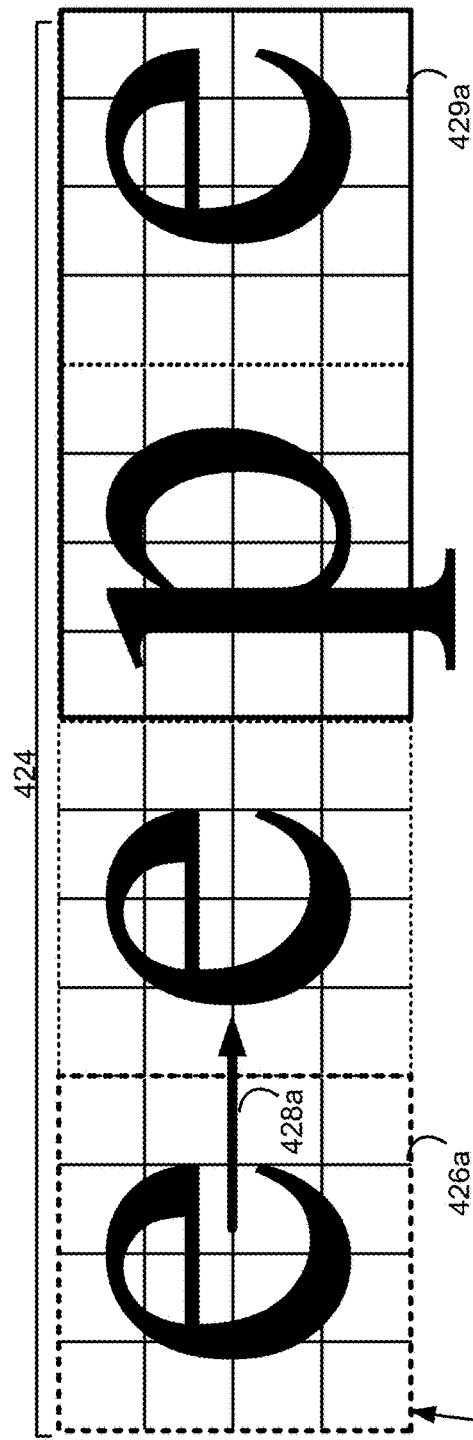
FIG. 4 illustrates an example of encoding visual elements of multiple video frames with different parameter settings.
Figure 4:
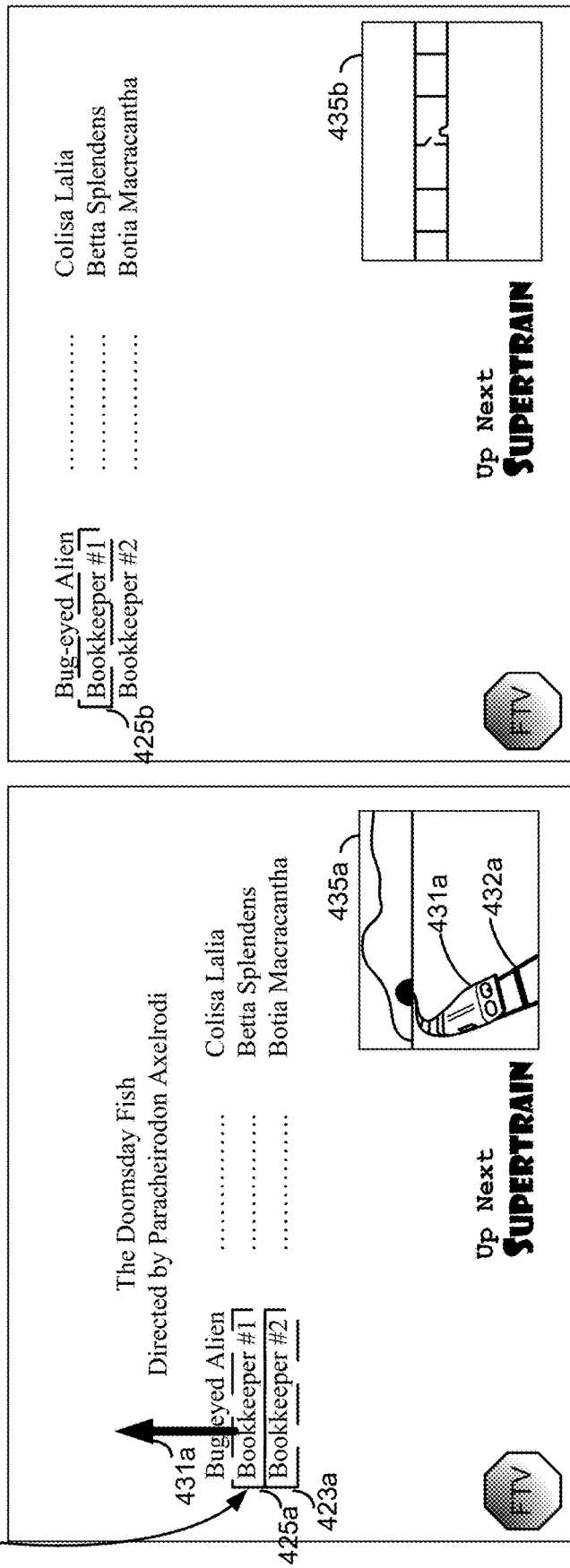

For example, with reference to FIG. 4, visual element 425*a* can correspond to a particular word, "bookkeeper" in the scrolling end credits. For video frame 405*a*, visual elements metadata 215 can include information such as the text string "bookkeeper," the top left X and Y pixel coordinates of the word "bookkeeper," the character spacing between each letter, the font size, the font type, uppercase or lowercase, stylization (bold, italics, underlining, etc.), and so forth.

Using such information from visual elements metadata 215, encoder 235 can configure a block 426*a*. Block 426*a* can include the first "e" in "bookkeeper," as shown in a pixel region 424 depicting a close-up of a subset of pixels of visual element for 425*a*. For example, the position of block 426*a* can be determined based on the known top left pixel coordinates of the word "bookkeeper" along with the font size, character spacing, and/or other characteristics.

As a further example, using visual elements metadata 215, encoder 235 can configure and additional block corresponding to the subsequent instance of "e" based on the information describing the sequence of letters, the font size for each letter, and the spacing between each letter. This additional block can be represented by encoder 235 using prediction vector for 428*a* indicating the spatial displacement relative to the encoded version of block 426*a*. It should be noted that in this scenario, multiple instances of "e" are processed by encoder 235 without performing a search operation.

In some implementations, visual elements metadata 215 may not include characteristics such as character spacing. In such a scenario, the precise locations of each instance of "e" in "bookkeeper" are not available. Encoder 235 can configure a constrained search range for instances of "e". For example, the search for the instance of "e" following the "p" can be constrained to the horizontal axis of video frame 405*a* relative to the top left X and Y pixel of visual element 425*a*, and to a limited horizontal range corresponding to a maximum character spacing. Pixel region 424 depicts a portion of a motion search range 429*a* for "e." Once a match has been detected, a prediction vector can be encoded. It should be noted that in this scenario, multiple instances of "e" are processed by encoder 235 with a limited motion search operation. In some implementations, for conserving the number of bits to represent predictions, predictions can be limited to certain orientations, such as horizontal, vertical, 45°, and so forth.

In particular implementations, encoder 235 can configure a sub-pel precision encoding parameter. For example, graphics and text are sometimes not aligned along pixel boundaries. Using location information in visual elements metadata 215, the sub-pel precision parameter (half pixel, quarter pixel, etc.) for the search operation can be adjusted to allow for a match to minimize residuals. In pixel region 424, the "e" following the "p" is slightly offset to the right by a fraction of a pixel relative to block 426a. Sub-pel precision can account for such offsets to maintain high prediction accuracy.

In certain implementations, encoder 235 can use visual elements metadata 215 to configure encoding parameters relating to multiple visual elements. For example, visual elements metadata 215 may indicate that visual element 425a and visual element 423a both include the word "bookkeeper." Encoder 235 can encode visual element 425a, with or without the encoding techniques as described above relating to exploiting the spatial redundancy corresponding to repeated letters within the word "bookkeeper". In scenarios where visual elements metadata 215 indicates the precise locations of each instance of "bookkeeper," the second instance, visual element 423a, can be encoded using a prediction vector relative to the encoded visual element 425a. Similar to the scenario described earlier, in scenarios where relative positions are not known, a constrained prediction search range, such as only in the vertical axis, can be utilized. Therefore, it should be appreciated that visual elements metadata 215 can be used by encoder 235 to configure encoding parameters for pixels within a visual element, or for pixels associated with different visual elements.

It should also be noted that prediction as described herein is not limited to spatial displacement within a video frame. For example, prediction can include spatial displacement across different video frames (e.g., temporal redundancy), such as the movement of the letters "o," "k" and "e" within the word "bookkeeper" in scrolling end credits. Thus, in some implementations, encoding parameters can be configured for interframe motion prediction (e.g., motion estimation, motion compensation) of visual elements.

Motion prediction involves deriving a motion vector representing a displacement between a subset of pixels in a reference video frame and a subset of pixels in a different video frame, and the subset of pixels are determined to exceed a threshold for a block matching algorithm (BMA). For example, visual elements metadata 215 can include a direction and scrolling rate 431a for visual element 425a, and encoder 235 can configure a motion search range encoding parameter based on the direction, scrolling rate, and the elapsed time for a subsequent video frame that contains visual element 425b that corresponds to visual element 425a in a different position in a subsequent video frame 405b. In addition to reducing computation time by constraining or eliminating motion searching, using visual elements metadata 215 to configure encoding parameters to result in more accurate motion vectors can reduce the size of residuals, and therefore reduce the overall transmission bit rate It should be appreciated that reference to "bookkeeper" as a visual element is for illustrative purposes, and that each letter within "bookkeeper," and/or a phrase, sentence, etc., containing "bookkeeper" can also be considered as a visual element. It should also be noted that there can be a nested hierarchy, such as "e" being an individual visual element and also a part of the visual element "bookkeeper."

In some implementations, the characteristics stored in visual elements metadata 215 can be used to configure encoding parameters related to the size and/or shape for a block, macro block, coding unit or spatial region of a video frame. For example, as the shape and location of the picture-in-picture visual element 435a is known, the block sizes around the boundaries of visual element 435a can be optimized.

As an example, the natural imagery in the live-action movie Supertrain is overlaid over a black background using a white border, thereby resulting in a sharp edge transition. Large block sizes along the boundaries of visual element 435a that include both the natural imagery and synthetic imagery (such as the white border) may be inefficiently coded.

This is because if the discrete cosine transform (DCT) and quantization is used for the block, the transform will be efficient for the continuous-tone, bandwidth-limited natural imagery portion, but will not be efficient for the synthetic imagery portion which has high spatial frequency content that will consume a disproportionate number of bits and provide suboptimal image quality due to quantization of the high-frequency coefficients.

In contrast, if the DCT is skipped, the synthetic imagery portion may in certain instances be directly encoded in an efficient manner, but the natural imagery portion may be inefficiently coded, again resulting in an inefficient use of bits.

In some implementations, media server 210 can use the characteristics in visual elements metadata 215 to configure encoder 235 to use the smallest available block size such that a particular block includes mostly one type of imagery (synthetic, natural, CGI, etc.), thereby improving encoding efficiency.

In certain implementations, using visual elements metadata 215 to determine a block size or subset of block sizes can eliminate or constrain the number of block sizes to test to optimize particular encoding criteria, e.g., rate-distortion criteria that balances encoded image quality with transmission bitrates.

As a further example of adjusting the block size encoding parameter, in the case of text for visual element 425a, when repeating sequences of letters are used, block sizes can be expanded to include the whole similar region, such as the consecutive letters "oo" and "ee." The larger block sizes can make motion searching less computationally intensive and more accurate.

In some implementations, the characteristics stored in visual elements metadata 215 can be used to configure encoding parameters related to asymmetric motion partition (AMP).

For certain encoding algorithms, including but not limited to H.264, the position and size of blocks may be constrained, such as 4×4, 8×8, or 16×16 pixels. Therefore, even when using visual elements metadata 215 to select a smallest block size, as previously described, the selected block size may still partly include a moving object, such as the live-action content of Supertrain, and partly include a background that moves differently or not at all (e.g., the black background of scrolling end credits). In such cases, encoding results are suboptimal because the motion vector for the live-action content will differ from the motion vector for the stationary black background.

Additional coding gains can be achieved by partitioning the block and tailoring the shape of each sub-block being motion compensated. For example, with AMP, a sub-block can be one pixel thick. For instance, a 4×4 block can be partitioned as the 3 left columns of pixels, and the 1 right column of pixels. Referring to FIG. 4, for the picture-in-picture visual element 435a, a 4×4 block may have the leftmost three columns 3 include the live-action content of Supertrain, and the rightmost column includes the white border or black background of the scrolling end credits. Each asymmetric partition can have its own motion vector, and/or reference different video frames. The separate motion vectors for the live-action portion of the block and the stationary background portion of the block results in greater coding efficiency for the block. As another example, AMP is also useful in boundaries of repeated objects, particularly sharply defined ones like letters.

It should be appreciated that a particular block may be subdivided into a variety of sub-block shapes, and each sub-block shape can share or have an independent motion vector with a respective reference video frame.

In some implementations, the characteristics stored in visual elements metadata 215 can be used to configure encoding parameters that indicate whether a block should be a "predicted" or "skip" block. Residuals correspond to the difference between the block of pixels to encode and the best match identified. For a predicted block, residuals are calculated based on a particular intra- or inter-mode prediction, and then compressed, and then transmitted.

For a skip block, the encoder treats the block to be encoded as a perfect match with a previously encoded reference block, meaning no residuals are calculated and transmitted. By not encoding residuals, calculation time is shortened and the transmission bit rate is reduced. For example, in cases where visual elements metadata 215 indicates two blocks should be identical, even though in actuality there is a small residual, encoder 235 can use an encoding parameter corresponding to skip rather than predicted. For instance, this could happen when sub-pixel alignment is slightly off.

At the decoder, residuals are decoded, added to a reference pixel block, and the encoded block is reconstructed. In some cases, if the prediction match is poor, it may take more bits to transmit the residuals than to code and transmit the pixel block without prediction. By using visual elements metadata 215 to determine whether a block should use the predicted or skip option, encoder 235 does not need to perform both options and compare them to determine which option results in fewer bits.

In some implementations, the characteristics stored in visual elements metadata 215 can be used to configure encoding parameters indicating whether to skip a transform, including but not limited to the DCT or wavelet transform. For example, visual element 425a contains synthetic content with sharp edges, like text. Therefore, there is significant high-frequency content that causes the frequency transform result to include numerous transform coefficients that need to be transmitted, even after quantization. The number of bits to encode the transform coefficients may exceed the number of bits to directly encode the non-transformed subset of pixels, such as through quantization followed by run length encoding (RLE). RLE involves encoding information about sequences of pixel values rather than encoding the pixel values themselves.

In certain scenarios, an encoder calculates the number of bits for encoding a subset of pixels using a transform, calculates the number of bits for encoding the subset of pixels without a transform, and selects the option with the fewest bits. In some cases, using visual elements metadata 215 to configure transform or skip encoding parameters such that encoder 235 does not need to test and compare both options reduces encoding latency.

In some implementations, the characteristics stored in visual elements metadata 215 can be used to configure encoding parameters related to lossless coding. In lossless coding, both the transform operation, which introduces loss due to the finite precision of transform computations, and the quantization operation, which introduces loss due to the mapping of a range of values to a single value, are skipped (in contrast to the transform skip encoding parameter, where the transform is skipped but the quantization step is not skipped).

For example, for sharp edged and simple content such as graphics over a football game, scrolling credits at the end of a program, subtitles, lettering and other repeated elements in comic book art, and so forth, lossless coding can result in the most efficient use of bits without degrading image quality. For instance, text on a flat background, such as for the scrolling credits of visual element 425a, can be efficiently encoded using lossless coding.

It should be noted that lossless coding is computationally intensive for entire video frames, and furthermore, typically not efficient for coding natural images. Therefore, using visual elements metadata 215 to identify lossless or lossy encoding for a particular visual element such that encoder 235 does not need to test and compare both options reduces encoding latency.

In some implementations, the characteristics stored in visual elements metadata 215 can be used to configure encoding parameters related to quantization. The quantization parameter (QP) represents a scaling factor applied to transform residual coefficients. For example, for a particular residual matrix indicating differences in pixel luminance values for two different portions of the same or different video frames, the particular QP value scales the residual coefficients as a compression technique.

When a visual element is repeated in a particular video frame or other video frames, configuring a high quality setting for encoding the first instance of the visual element is beneficial. Having a high quality encoding to serve as the reference for each of the other instances of the visual element results in higher accuracy predictions, which can reduce the size of the residuals for both intra-mode and inter-mode predictions. For example, based on information in visual elements metadata 215 that the letter "e" is repeated numerous times in video frame 405a and/or 405b, or based on information that the letter "e" is statistically the most likely to occur in English text, the first instance of "e" can be encoded with a reduced QP. Each of the other instances of "e," with identical or slightly modified characteristics, may result in a smaller residual, thereby reducing overall bitrates.

Separately, sharp-edged synthetic elements also require lower QP for equivalent subjective quality relative to natural imagery. In some implementations, using visual elements metadata 215 to configure encoder 235 with an adaptive quantization parameter based on whether a particular visual element is synthetic or natural can improve overall image quality of the encoded video frame.

It should be appreciated that the encoding techniques described herein are not limited to the specific encoding parameters discussed. The encoding techniques described herein are compatible with a wide range of encoding parameters, such as but not limited to encoding parameters associated with a particular hardware/software encoder, video compression standard, encoder API, commercial or consumer video production application, profile, extension (e.g., HEVC Screen Content Coding (SCC), etc.), and so forth. It should further be appreciated that encoding parameters are not limited to the spatial (e.g., intra-block copying, etc.) or temporal (e.g., inter-frame motion prediction) contexts as described in certain examples herein. For example, encoding parameters include but are not limited to chromatic and achromatic parameters such as luminance, chroma, color space, and so forth.

It should be noted that using visual elements metadata is not limited to selecting certain values for particular encoding parameters. For example, visual elements metadata can be used as an input to modify the analytical flow during the encoding process. For instance, visual elements metadata can be used to set a binary flag indicating whether to analyze video content using the palette mode of HEVC SCC. The palette mode analysis then results in a particular encoding parameter value.

It should further be appreciated that discussion of encoding parameters in the context of intra-mode or inter-mode in the examples disclosed herein are not intended to limit the applicability of an encoding parameter to either particular mode.

It should further be appreciated that discussion of visual elements in the context of synthetic imagery or natural imagery are not intended to limit the applicability of the encoding parameter tuning techniques described herein to a specific type of imagery.

For example, the picture-in-picture visual element 435a and 435b include natural imagery corresponding to the live-action content of Supertrain. The natural imagery might have more blurred edges rather than sharp edges, gradual colors rather than sudden color changes as in synthetic imagery, and so forth. Such natural imagery in visual element 435a may include visual element 431a corresponding to a train, and visual element 432a corresponding to train tracks. For example, the constrained motion search range as described for synthetic scrolling end credits are applicable to the natural imagery of visual element 431a based on the semantic knowledge that a train is likely to follow a motion trajectory governed by train tracks, and therefore motion searching should be constrained to a particular orientation. As another example, the transform skip encoding parameter described for synthetic lettering in the end credits is applicable to the natural imagery of visual element 432a since train tracks exhibit the sharp edges similar to lettering.

In some implementations, the encoding parameters for visual elements can be based on the characteristics or encoding parameters of other visual elements. For example, one visual element might be determined to have characteristics that result in a first set of encoding parameters, and a second visual element might be determined to have different characteristics that would result in a second set of encoding parameters. If the visual elements are adjacent to each other in the playback of video frame 405a, such as text "Up Next Supertrain" adjacent to the preview of live-action content from Supertrain, then the encoding parameters of one or both of the visual elements can be scaled, or modified, in respect to each other to reduce the perceptibility of transitions where there are large differences in encoding parameters. This might reduce jarring visual transitions. As an example, the change in the value for the quantization parameter from the first to the second visual element might be limited to a certain percentage of the value of the quantization parameter for the first visual element.

It should be appreciated that the techniques disclosed herein enable encoding parameters to be tuned based on visual elements metadata 215 to reduce computational loads and/or encoding latency. In certain implementations, since the disclosed encoding optimization may combine increased precision with reduced motion search, the techniques can be tuned to offer at least as good encoding performance as when the technique is not used, allowing for practical use in real-time encoders for live broadcasting or low-latency video conferencing.

Referring again to FIG. 3, after configuring encoding parameters, the encoder can encode each video frame based on the encoding parameters for the visual elements in the video frame (315). As a result, the individual visual elements within a given frame can be encoded differently rather than having all of video frame 405a-b be encoded with the same parameter settings. The encoded video frame can then be provided to a viewer device for playback of the media content (320).

Though many of the examples disclosed herein use visual elements within a frame, other portions of media content may be used. For example, GOPs, scenes, chapters, periods, frames, etc. can be used as the different portions to be encoded with different sets of encoding parameters.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
generating a first video frame by integrating a synthetic visual element with a natural image, the first video frame including a plurality of pixels, a first subset of pixels corresponding to fewer than all of the pixels of the first video frame, the first subset of pixels corresponding to the synthetic visual element integrated with the natural image of the first video frame;
generating first metadata based on one or more characteristics of the synthetic visual element, the first metadata representing the one or more characteristics of the synthetic visual element corresponding to the first subset of pixels;
configuring a video encoding parameter for the first subset of pixels based on the first metadata; and
encoding the first video frame using the video encoding parameter.

2. The method of claim 1, wherein the first metadata represent one or more of a color, position, motion, a shape, a size, scaling, repetition, a transition, a quality, a type, or a level of interest for the synthetic visual element represented by the first subset of pixels.

3. The method of claim 1, wherein the video encoding parameter corresponds to one or more of motion prediction, block size, predicted block, skip block, sub-pel precision, asymmetric motion partition, transform skip, lossless coding, color transform, adaptive motion vector resolution, intra block copying, color based prediction, quantization parameter, or frame type parameter.

4. The method of claim 1, wherein the first video frame corresponds to a live broadcast of a live event, and wherein the encoding of the first video frame occurs in near real time relative to the live event.

5. The method of claim 1, wherein the first metadata for the first subset of pixels also represents a second subset of pixels of a second video frame, the method further comprising encoding the second subset of pixels with reference to the encoding of the first subset of pixels in the first video frame.

6. The method of claim 1, wherein the first metadata are included in extensible markup language (XML) data, the XML data including timing information, the method further comprising associating the first metadata with the first video frame based on the timing information.

7. The method of claim 1, further comprising:
analyzing the first video frame to identify the synthetic visual element; and
generating the first metadata based on the analysis of the first video frame.

8. The method of claim 1, wherein encoding the first video frame includes encoding a first instance and a second instance of the synthetic visual element without performing a motion search, the first instance and the second instance being in different positions in the first video frame.

9. A computer-implemented method, comprising:
generating a first video frame by integrating a visual element with natural imagery, the first video frame including a plurality of pixels, a first subset of pixels corresponding to fewer than all of the pixels of the first video frame, the first subset of pixels corresponding to the visual element in the first video frame;
generating first metadata based on one or more characteristics of the visual element, the first metadata representing the one or more characteristics of the visual element corresponding to the first subset of pixels;
configuring a video encoding parameter for the first subset of pixels based on the first metadata; and
encoding the first video frame using the video encoding parameter.

10. The method of claim 9, wherein the first metadata represent one or more of a color, position, motion, a shape, a size, scaling, repetition, a transition, a quality, a type, or a level of interest for the visual element represented by the first subset of pixels.

11. The method of claim 9, wherein the video encoding parameter corresponds to one or more of motion prediction, block size, predicted block, skip block, sub-pel precision, asymmetric motion partition, transform skip, lossless coding, quantization parameter, color transform, adaptive motion vector resolution, intra block copying, color based prediction, or frame type parameter.

12. The method of claim 9, wherein the first video frame corresponds to a live broadcast of a live event, and wherein the encoding of the first video frame occurs in near real time relative to the live event.

13. The method of claim 9, wherein the first metadata for the first subset of pixels also represents a second subset of pixels of a second video frame, the method further comprising encoding the second subset of pixels with reference to the encoding of the first subset of pixels in the first video frame.

14. The method of claim 9, wherein the first metadata are included in extensible markup language (XML) data, the XML data including timing information, the method further comprising associating the first metadata with the first video frame based on the timing information.

15. The method of claim 9, further comprising:
analyzing the first video frame to identify the visual element; and
generating the first metadata based on the analysis of the first video frame.

16. The method of claim 9, wherein encoding the first video frame includes encoding a first instance and a second instance of the visual element without performing a motion search, the first instance and the second instance being in different positions in the first video frame.

17. A system, comprising one or more processors and memory configured to:
generate a first video frame by integrating a visual element with natural imagery, the first video frame including a plurality of pixels, a first subset of pixels corresponding to fewer than all of the pixels of the first video frame, the first subset of pixels corresponding to the visual element in the first video frame;
generate first metadata based on one or more characteristics of the visual element, the first metadata representing the one or more characteristics of the visual element corresponding to the first subset of pixels;
configure a video encoding parameter for the first subset of pixels based on the first metadata; and
encode the first video frame using the video encoding parameter.

18. The system of claim 17, wherein the first metadata represent one or more of a color, position, motion, a shape, a size, scaling, repetition, a transition, a quality, a type, or a level of interest for the visual element represented by the first subset of pixels.

19. The system of claim 17, wherein the video encoding parameter corresponds to one or more of motion prediction, block size, predicted block, skip block, sub-pel precision, asymmetric motion partition, transform skip, lossless coding, quantization parameter, color transform, adaptive motion vector resolution, intra block copying, color based prediction, or frame type parameter.

20. The system of claim 17, the one or more processors and memory further configured to:
analyze the first video frame to identify the visual element; and
generate the first metadata based on the analysis of the first video frame.

* * * * *